United

Moraru et al.

[11] 3,837,864
[45] Sept. 24, 1974

[54] COMPOSITION FOR PREVENTING BIODETERIORATION OF CONCRETE IN BIOLOGICALLY ACTIVE WATER

[75] Inventors: Dinu Stefan Moraru; Ion Pitis, both of Bucharest; Dumitru Topala, Constanta-Aleen, all of Romania

[73] Assignee: Institutul de Cercetari in Constructii si Economia Constructiilor-Incerc, Bucharest, Romania

[22] Filed: Oct. 10, 1972

[21] Appl. No.: 296,088

[30] Foreign Application Priority Data
Oct. 15, 1970  Romania .............................. 68476

[52] U.S. Cl. ............................................ 106/15 AF
[51] Int. Cl. .............................................. C09d 5/14
[58] Field of Search ................................ 106/15 AF

[56] References Cited
UNITED STATES PATENTS
2,489,228  11/1949  Rudd .............................. 106/15 AF
3,337,352  8/1967  Sano et al. ...................... 106/15 AF

*Primary Examiner*—Harry Wong, Jr.
*Attorney, Agent, or Firm*—Karl F. Ross; Herbert Dubno

[57] ABSTRACT

A composition for the treatment of concrete structures to protect them against biodegradation in contact with biologically active water. The density of the treatment composition is designed such that it penetrates to a depth to about 10 mm and has a specific gravity which is $10^7$ times greater than the solution surface tension as against concrete. The composition may contain a toxic substance which reduces biological attack and white spirit to obtain the desired specific gravity.

1 Claim, No Drawings

COMPOSITION FOR PREVENTING BIODETERIORATION OF CONCRETE IN BIOLOGICALLY ACTIVE WATER

1. FIELD OF THE INVENTION

The present invention relates to a composition for the treatment of concrete structures exposed to biologically active liquids, e.g sea-water, to prevent biodegradation or biodeterioration of the concrete.

2. BACKGROUND OF THE INVENTION

Several methods have been provided to protect metallic and nonmetallic structures against biological deterioration when the structures are exposed to a biologically active environment such as an atmosphere or liquid containing micro-organisms capable of causing deterioration of the material from which the structures are made. The treatment may be applied as a coating to the ship's hull, fishing tackle or like immersible member or can be incorporated in the materials themselves.

These techniques have not been found to be useful with structures of concrete, especially precast and prestressed concrete, immersed in biologically active waters. A suitable treatment for concrete must be characterized by a wide toxicity spectrum, permanence and impermeability if it is to have any significant value.

Treatment with marine paints and the like containing materials toxic to the organisms present in water, i.e. anti-fouling components, are effective in use upon ships and the like but have the disadvantage that they can only be applied effectively to smooth surfaces and cannot be used with a spongy or porous structure, i.e., concrete. Moreover, they do not render a significant thickness of the concrete surface effective to block biodegradation and are therefore only effective in a limited thickness layer which has only weak adhesion to the substrate.

3. OBJECT OF THE INVENTION

It is the object of the present invention to provide an improved composition for the protection of concrete structures against biodegradation in contact with biologically active water.

4. SUMMARY OF THE INVENTION

This object and others which will become apparent hereinafter are attained, in accordance with the present invention, with a composition which is surprisingly effective in protecting concrete against biodegradation and is free from the disadvantage stated earlier. The composition of the present invention is capable of penetrating concrete so that a toxic crust is formed on the surface of the concrete structure, preferably to a depth of the order of 10 mm, the composition containing any of the oligodynamic materials toxic to marine organisms which have been proposed heretofore.

The crux of the invention is that the composition has a specific gravity which is adjusted in accordance with the average diameter of the pores of the surface to which it is applied so that it penetrates to a depth of 10 mm into the concrete, the specific gravity being $10^7$ times the surface tension of the solution as against concrete. The solution comprises, preferably, copper naphthenate, white spirit and naphthol, the white spirit component being capable of adjusting the specific gravity or viscosity as noted.

A solution of the aforedescribed type has a wide toxicity spectrum against marine organisms capable of fouling a surface. Preferably the substance is a mixture of a 94 percent copper naphthenate, 50 percent white spirit solution, about 6 percent $\beta$-naphthol or 3 percent tributyl tin oxide. Other insoluble antiseptics can be applied as well. The white spirit is added in the amount necessary to obtain, for a given concrete surface, a penetration of 10 mm, the specific gravity of the solution being also $10^7$ times the surface tension thereof with respect to concrete. Preferably the composition is applied in four coatings with a time interval between them.

5. EXAMPLE

A solution of 2 parts copper naphthenate, 50 percent white spirit, 0.12 parts $\beta$-naphthol and 1.5 parts white spirit is applied in the following manner:

first coating with solution permitted to penetrate for at least 15 minutes. Second coating applied 15 minutes after the first; third coating applied 30 minutes after the second and fourth coating applied after at least 60 minutes from the application of the third. The product was found to prevent biodegradation of concrete immersed in sea-water.

We claim:

1. A composition for the treatment of concrete adapted to be immersed in water to prevent biodeterioration of the concrete by micro-organisms present in the water, said composition consisting essentially of copper naphthenate as a substance toxic to marine organisms, $\beta$-naphthol of tributyl tin oxide, and white spirit as a solvent in such proportion that the specific gravity of the solution is substantially $10^7$ times the surface tension of the composition as against concrete and that said composition penetrates to a depth of 10 mm upon application thereto.

* * * * *